United States Patent [19]

Rogers

[11] 4,023,666

[45] * May 17, 1977

[54] HIGH SPEED BOTTLE TRANSFER MACHINE

[75] Inventor: James H. Rogers, Lebanon Junction, Ky.

[73] Assignee: Mac Manufacturing Company, Lebanon Junction, Ky.

[ * ] Notice: The portion of the term of this patent subsequent to Apr. 27, 1993, has been disclaimed.

[22] Filed: Mar. 9, 1976

[21] Appl. No.: 665,232

Related U.S. Application Data

[63] Continuation-in-part of Ser. No. 498,995, Aug. 20, 1974, Pat. No. 3,952,855.

[52] U.S. Cl. .......................................... 198/449
[51] Int. Cl.$^2$ ........................................ B65G 47/68
[58] Field of Search ............... 198/433, 447–451, 198/457, 459, 611, 612, 670, 604, 620, 625

[56] References Cited

UNITED STATES PATENTS

| | | | |
|---|---|---|---|
| 1,835,814 | 12/1931 | Schroder | 198/442 |
| 2,459,264 | 1/1949 | Cerruti | 198/447 |
| 2,575,220 | 11/1951 | Hiller | 198/433 |
| 2,687,797 | 8/1954 | Hirsch et al. | 198/433 |
| 2,791,315 | 5/1957 | Chapman | 198/447 |
| 2,829,757 | 4/1958 | Breeback | 198/612 |
| 2,951,574 | 9/1960 | Craig | 198/433 |
| 3,179,231 | 4/1965 | Craig | 198/448 |
| 3,351,175 | 11/1967 | Erickson et al. | 198/451 |
| 3,557,932 | 1/1971 | Laub | 198/433 |
| 3,952,855 | 4/1976 | Rogers | 198/449 |

Primary Examiner—Evon C. Blunk
Assistant Examiner—Jeffrey V. Nase
Attorney, Agent, or Firm—Wm. R. Price

[57] ABSTRACT

Discloses a machine for feeding groups of bottles in case formation in one-by-one fashion onto an outlet conveyor. The machine involves the use of a spacing conveyor interposed between the feed conveyor and the outlet conveyor and channel means disposed over the end of the feed conveyor so as to orient the groups of bottles in side-by-side rows as they were taken from the case. Spacing guides are positioned on the spacing conveyor at an angle so that a row of bottles in side-by-side relation are retained on the spacing conveyor while the foremost row is angled so that the bottles reach the outlet conveyor at different times and can then be carried away one at a time. The spacing guides are angled so that the last bottle in one row is fed onto the outlet conveyor before the first bottle of the next row is fed onto the outlet conveyor. A series of gates are supplied at the end of all but the last channel so that the gates separate the bottles as they are fed onto the outlet conveyor. A timing screw driven in the same direction as the outlet conveyor and in synchronism therewith engages each of the bottles in a pocket as it is fed onto the outlet conveyor and carries it along the outlet conveyor.

6 Claims, 4 Drawing Figures

HIGH SPEED BOTTLE TRANSFER MACHINE

CROSS REFERENCE TO RELATED APPLICATION

This application is a continuation-in-part of my earlier copending application for "HIGH SPEED BOTTLE TRANSFER MACHINE", Ser. No. 498,995, filed in the United State Patent Office on Aug. 20, 1974 which issued on Apr. 27, 1976 as U.S. Pat. No. 3,952,855.

FIELD OF THE INVENTION

This invention relates to a bottle orientation mechanism and more particularly to a machine for receiving a variety of bottles in case formation from a carton unloader and for arranging said bottles in side-by-side rows so as to feed them in timed manner onto a conveyor or the like.

BACKGROUND OF THE INVENTION

Empty bottles are dumped from cases onto a conveyor prior to their being filled. These bottles are thus lined up on the conveyor belt in the same pattern that they were in the carton. The problem is to get the bottles into a single line to be fed to the filling equipment. The best solution is to release the bottles onto an outlet conveyor one at a time to avoid two bottles reaching the same point at the same time and jamming. In instances involving pint and half-pint bottles, for example, there is an additional problem of turning the bottles in a direction approaching 90 degrees to be fed onto the outlet conveyor. My previous application, Ser. No. 498,995, filed Aug. 20, 1974, provided an apparatus for properly orienting the bottles and feeding same onto an outlet conveyor at speeds up to 180 bottles per minute. However, at speeds in excess of 180 bottles per minute, there was insufficient vertical stability so that the bottles tended to fall backwards as they moved onto the outlet conveyor. Further, since there was glass-to-glass contact, the noise level due to the bottles touching against each other at such high speeds was not entirely satisfactory.

SUMMARY OF THE INVENTION

According to the present invention, the bottles, after being unloaded from the carton onto the feed conveyor are fed into channel guides so as to be oriented in side-by-side rows as has previously been taught in my application, Ser. No. 498,995. Further, according to the same application, there is provided a spacing conveyor interposed between the feed conveyor and the outlet conveyor, normal to the feed conveyor so that the feed conveyor feeds onto the spacing conveyor. The direction of the conveying surface of the spacing conveyor is opposite to the direction of travel of the conveying surface of the outlet conveyor directly adjacent to it. Further, spacing guide means are positioned on the spacing conveyor at an angle so that the separating or leading point of the spacing guide can split a row of bottles apart and push the row of bottles out toward the outlet conveyor at an angle generated by the spacing guide. Simultaneously, the retaining side of the spacing guide acts to retain the subsequent row of bottles and angles these rows out sufficiently to provide space for the separating point of the subsequent spacing guide to plow in between it and a subsequent row of bottles. According to this application, however, the spacing guide is not made of steel lugs as was disclosed in my copending application, but the spacing guide is fabricated of individual blocks of high-density polyethylene or other polymeric material so that contact with the glass bottles does not cause undesirable sound or breakage. Further, there is provided at the end of each of the channel guides, gates, hinged and fabricated of high-density polyethylene so as to physically separate each of the bottles leaving the channel as it goes onto the outlet conveyor. Thus, as the bottles leaves its channel, it opens up the gate and the subsequent bottle moving along the outlet conveyor closes the gate for the next row of bottles to be fed onto the spacing conveyor. Thus, the bottles as they are fed onto the conveyor are physically separated from each other and do not cause any undue noise or breakage, Additionally, as mentioned previously, the apparatus according to my copending application, although quite effective up to speeds of 180 bottles per minute, was unsatisfactory at speeds in excess thereof. This was because the bottles became vertically unstable at the higher speeds and tended to fall backwards. This problem has been solved in the present invention by provision of a timing screw having helical flights forming pockets between the two points of the helical flight to engage a bottle leaving its channel and propel it along the outlet conveyor. The timing screw, according to this invention, is fabricated of a polymeric material, again such as high-density polyethylene so as to eliminate noise and breakage to allow speeds of conveying bottles along the outlet conveyor of up to and in excess of 400 bottles per minute.

BRIEF DESCRIPTION OF THE DRAWINGS

Referring now to the drawings.

DESCRIPTION OF THE PREFERRED EMBODIMENT

Figure 1:
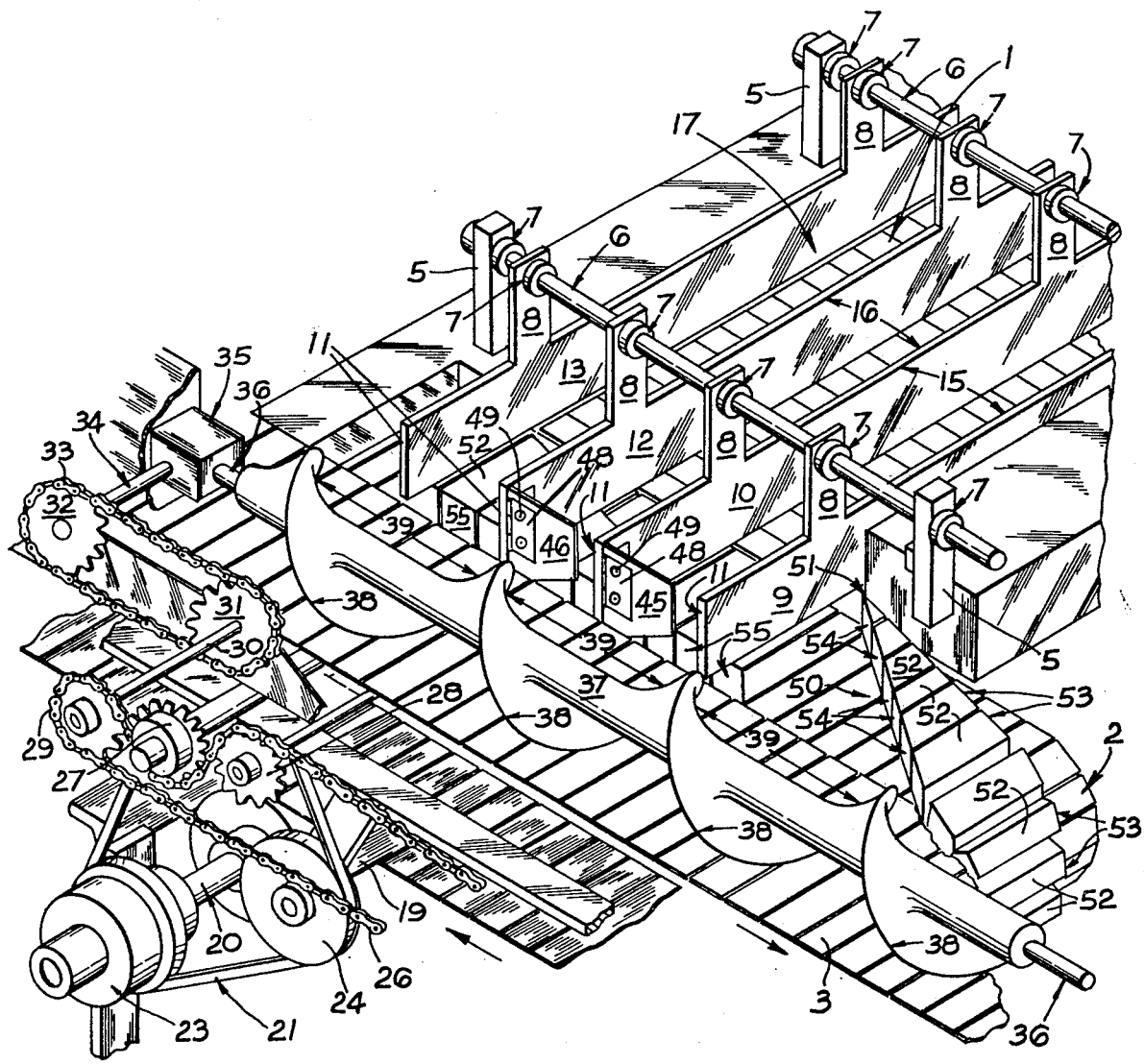
FIG. 1 is a perspective view of the present invention illustrating the relationship of the feed conveyor to the spacing conveyor and relationship of the feed conveyor and spacing conveyor to the outlet conveyor and the relationship of the outlet conveyor to the timing screw.

Referring now to the drawings in detail, the feed conveyor 1 comprises an endless belt of flat articulated chain links as is indicated in FIG. 1 and moves in the direction illustrated by the arrow.

The spacing conveyor 2, made of flat articulated chain links is located with its long axis normal to the long axis of the feed conveyor 1 so that the feed conveyor feeds bottles onto the spacing conveyor. The conveying surface of the spacing conveyor moves in the direction illustrated which, it will be noted, is opposite to the direction of the conveying surface of outlet conveyor 3. Again, the outlet conveyor 3 is comprised of flat articulated chain links. Channel support means 8 are supported by means of transverse bars 6 trained through holes 7 in post 5 near the outlet portion of the conveyor. For purposes of description, the proximal channel guide 9, the middle channel guide 10 and 12 and the distal channel guide 13 extend all the way across the spacing conveyor 2 to the inner edge of the outlet conveyor 3. These channel guides then form proximal channel 15, middle channel 16 and distal channel 17. Gate 45 is connected to middle channel guide 10 by means of hinge 48 held into position by pop rivets 49, while gate 46 is connected to channel guide 12 again by means of hinge 48 so as to be swingingly disposed at the end of the proximal channel 15 and the middle channel 16. The distal gate (not shown) maybe hingedly connected to distal channel guide 13.

In the modification of the invention illustrated, the motor generally is indicated at 19 and is utilized as a drive means for both the spacing conveyor 2 and the outlet conveyor 3 as well as the timing screw 37. It is, of course, within the scope of this invention to run each of the conveyors by a separate driving means. Nevertheless, in the modification illustrated in FIG. 1, the motor 19 is connected to shaft 20 which in turn is connected to belt 21 which is trained over drive sheave 23, tension sheave 24, and driven sheave (not shown). The driving chain 26 is trained over the tension sprocket 29 and trained under the drive sprocket 27 which drives the outlet conveyor 3 thence over drive sprocket 28 (for spacing conveyor 2) and thence over the driven sprocket (not shown) for the spacing conveyor 2. The tension sprocket 29 drives the shaft 30 to drive sprocket 31 which by means of chain 33 trained thereover drives sprocket 32. Shaft 34, for sprocket 33, is connected to a gear reduction box 35 which in turn drives the shaft 36 of the timing screw 37 in synchronism with the spacing conveyor 2 and the outlet conveyor 3. The timing screw 37 is fabricated of high-density polyethylene and consists of a series of helical flights 38 forming pockets 39 which engage with the bottles leaving a particular channel and transports same down the outlet conveyor 3.

The guide means 50 are made up of a series of blocks 52 of high-density polyethylene and form at the front a separating or plowing point 51, a retaining edge 53 and a guiding edge 54. At the end of the guiding edge 54 is a backup edge 55 which runs along flush with the edge of spacing conveyor 2 and acts as a backup as the bottles feed into the pocket 39 of the timing screw 37.

OPERATION

Figure 2:
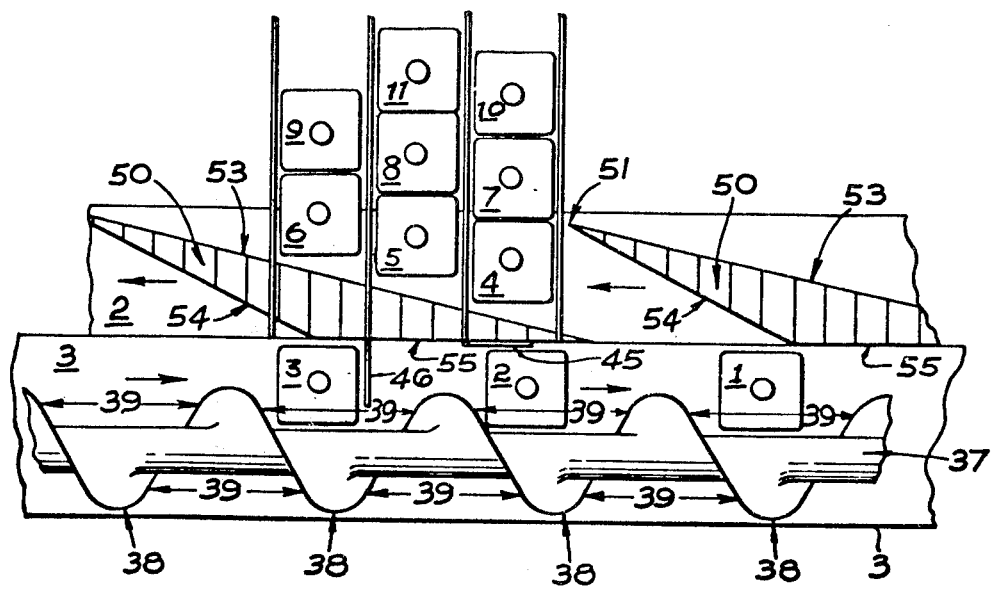
FIGS. 2, 3, and 4 are diagrammatic illustrations of the machine of this invention in operation, illustrating the relationship of guide means in retaining, guiding, and moving bottles from the feed conveyor to the outlet conveyor and which further illustrates the relationship of the spacing and outlet conveyor to the timing screw.
Figure 3:
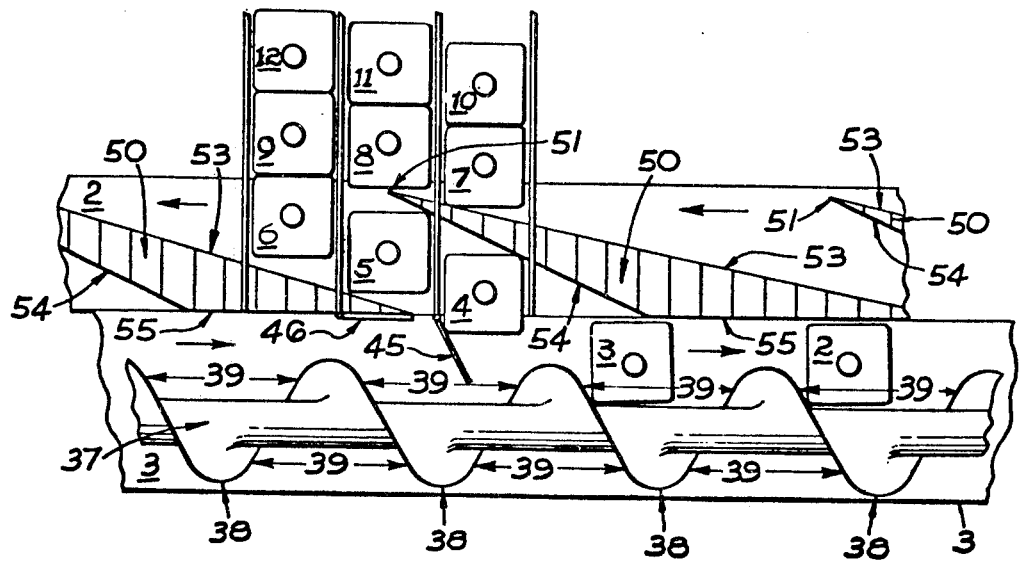

The operation of the conveyor and the guiding means can best be illustrated by reference to FIGS. 2, 3, and 4 wherein the bottles are shown numbered 1 through 15, being fed from the feed conveyor 1 onto the spacing conveyor 2 and then outward to the outlet conveyor 3. It will be noted that in FIG. 2, bottles 1, 2, and 3 have already moved onto the outlet conveyor 3 and are moving in the direction shown by the arrow to the filling equipment. Each of the bottles is shown engaged in a pocket 39 of the timing screw 37. The square edges of the individual polymeric blocks 52, forming backup edge 55 of guide means 50 is shown in engagement with the back of the bottles as they feed into pockets 39 of the timing screw 37. Further, it will be noted in FIG. 2 that bottle 2 has closed gate 45 while gate 46 is open awaiting contact with bottle 3 which will in turn close it. Bottles 4, 5, and 6 have now assumed the angle generated by the retaining edge 53 of the guiding means so as to be in position for the plowing point 51 of guiding means 50 to separate the bottles 4, 5, and 6 from bottles 7, 8, and 9. Once this is accomplished, as is shown now in FIG. 3, the row of bottles formed by 4, 5, and 6 are pushed by the guiding edge, 54 of the guiding means 50 outwardly and transversely to the outlet conveyor 3 so as to feed off in one-by-one fashion. Again, it will be shown that bottle 4 being sent off of the spacing conveyor 2 onto outlet conveyor 3 is opening gate 45 while gate 46 is still in closed position.

Figure 4:
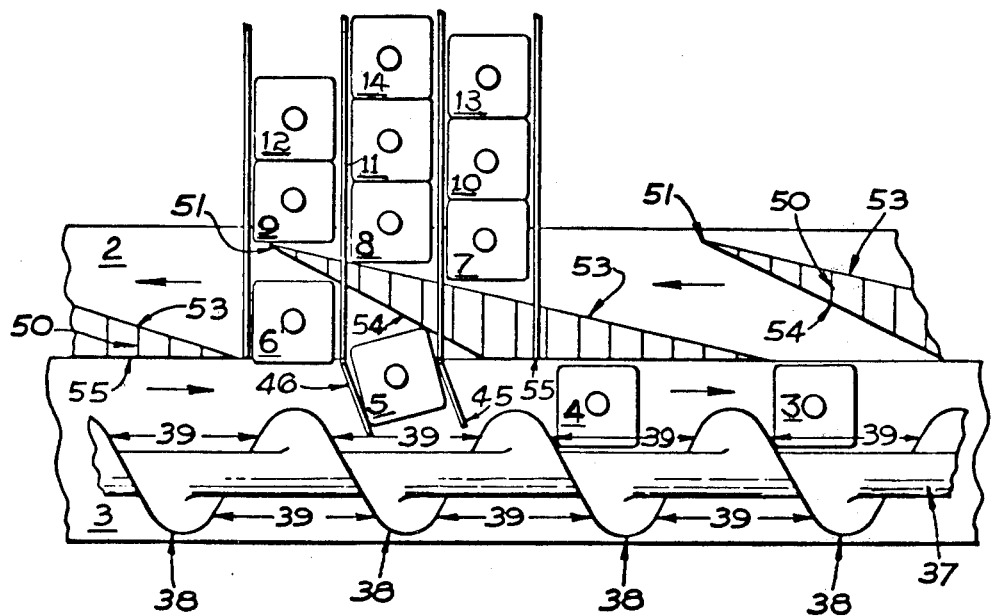

Referring now to FIG. 4, bottles 7, 8, and 9 retained in angular position by the retaining edge 53 of the guiding means 50 and subsequent bottles illustrated by 10, 11, and 12, begin to take on the angular configuration of the bottles 7, 8, and 9 in the preceding row. As is shown, the square edge of the individual polymeric blocks 52 forming the backup edge 55, backup the bottle 4 and hold it in proper engagement for fitting into pockets 39 of the conveying screw 37, so that it can be propelled rapidly along outlet conveyor 3.

As will be obvious, if this apparatus is utilized in conjunction with pint bottles, the pint bottles will fulcrum around the end 11 of the channel members 9, 10, 12, and 13, and again be fed into the pocket 39 of the timing screw properly for transportation down the outlet conveyor 3. While the material of fabrication of the timing screw, the polymeric blocks 52 and the gates 53 have been indicated as high-density polyethylene, it is quite obvious that other materials can be used which have a certain amount of resiliency so as to eliminate noise and minimize breakage of the glass bottles. Thus, for example, even wood could be utilized, however, high-density polyethylene, nylon, Teflon, or other relatively high-quality polymeric materials can be used all as within the skill of those skilled in the art.

Many modifications will occur to those skilled in the art from the detailed description hereinabove given and such is meant to be exemplary in nature and nonlimiting except so as to be commensurate in scope with the appended claims.

I claim:

1. A machine for feeding groups of articles in one-by-one fashion, onto an outlet conveyor, which comprises in combination:
    A. a longitudinal feed conveyor, located at right angles to said outlet conveyor for receiving groups of said articles and moving same toward said outlet conveyor;
    B. channel means comprising a plurality of channel members disposed above said feed conveyor and extending substantially to said outlet conveyor for orienting said articles into a plurality of side-by-side rows on said feed conveyor,
        1. said channel members extending along the longitudinal axis of said feed conveyor in parallel relation to each other,
    C. a spacing conveyor interposed between said feed conveyor and said outlet conveyor,
        1. said spacing conveyor lying adjacent and parallel to the inner edge of said outlet conveyor and normal to said feed conveyor so as to receive articles from said feed conveyor for delivery onto said outlet conveyor,
        2. the direction of the conveying surface of said spacing conveyor being opposite to the direction of the conveying surface of said outlet conveyor,
    D. the combination therewith of an obliquely disposed guide means on said spacing conveyor and below said channel means and moving with said spacing conveyor for simultaneously guiding, moving and pushing the articles transversely across the spacing conveyor onto said outlet conveyor in one-by-one fashion;
    E. the further combination therewith of a timing screw on said outlet conveyor, said timing screw being fabricated of a polymeric material and being driven in the same direction and in synchronism with said outlet conveyor for receiving articles from said spacing conveyor in one-by-one fashion and transporting said articles along said outlet conveyor.

2. A machine, as defined in claim 1, the improvement wherein,

A. said guiding means comprises a series of resilient polymeric blocks, in which each of said blocks is attached to said spacing conveyor in juxtaposition to an adjacent block similarly attached, the blocks being tapered at one end and of different lengths so as to form with adjacent blocks a tapered edge extending obliquely from a leading edge at the inner edge of said spacing conveyor and extending to the outer edge of said spacing conveyor.

3. A machine, as defined in claim 2, in which

A. the further improvement in which blocks forming said guide means are tapered at the other end so as to form with adjacent blocks of differing lengths a tapered edge extending obliquely from the outer edge of said spacing conveyor to the inner edge thereof, B. the further combination therewith of a second obliquely disclosed guide means comprising a series of polymeric blocks in which each of said blocks is attached across the transverse axis of said spacing conveyor in juxtaposition to adjacent blocks, similarly attached, said blocks being tapered at one end and of different lengths so as to form a tapered edge, extending obliquely from a leading edge at the inner edge of said spacing conveyor and extending obliquely to the outer edge of said spacing conveyor;

C. said leading edge of said second obliquely disclosed guide means forming with the trailing edge of said first guide means in obliquely disposed passage to accommodate the long diameter of said article and extending from said inner edge of said spacing conveyor to the outer edge of said spacing conveyor.

4. A machine, as defined in claim 2, in which said blocks, forming said guiding means, are cut off square at the end of said tapered edge at the outer edge of said spacing conveyor, so as to form a square edge flush with the outer edge of said spacing conveyor and the inner edge of said outlet conveyor to act as a backup edge for said timing screw.

5. A machine, as defined in claim 1, the improvement of gate members, fabricated of non-metallic material and hinged to the channel member on the distal side of said channel, said channel members being:

A. opened by the article in said channel, and

B. closed by the article in the adjacent channel moving along on said outlet conveyor.

6. A machine, as defined in claim 6, the improvement wherein said gate members are fabricated of resilient polymeric material.

* * * * *